United States Patent
Ateniese et al.

(10) Patent No.: US 12,058,234 B2
(45) Date of Patent: Aug. 6, 2024

(54) CRYPTOLOGIC BLOCKCHAIN-BASED OFF-CHAIN STORAGE VERIFICATION

(71) Applicants: Accenture Global Solutions Limited, Dublin (IE); Giuseppe Ateniese, Hoboken, NJ (US)

(72) Inventors: Giuseppe Ateniese, Hoboken, NJ (US); Giuseppe Giordano, Juan les Pins (FR); Luca Schiatti, Juan les Pins (FR); Abdoulaye Faye, Antibes (FR); Andrea Maria Milazzo, Juan les Pins (FR); Danilo Francati, Hoboken, NJ (US); Angelo Massimo Perillo, Milan (IT)

(73) Assignees: Accenture Global Solutions Limited, Dublin (IE); The Trustees of the Stevens Institute of Technology, Hoboken, NJ (US)

( * ) Notice: Subject to any disclaimer, the term of this patent is extended or adjusted under 35 U.S.C. 154(b) by 549 days.

(21) Appl. No.: 16/833,126

(22) Filed: Mar. 27, 2020

(65) Prior Publication Data

US 2020/0313859 A1 Oct. 1, 2020

Related U.S. Application Data

(60) Provisional application No. 62/826,473, filed on Mar. 29, 2019.

(51) Int. Cl.
*H04L 9/06* (2006.01)
*G06F 21/60* (2013.01)
(Continued)

(52) U.S. Cl.
CPC .......... *H04L 9/0637* (2013.01); *G06F 21/602* (2013.01); *H04L 9/14* (2013.01);
(Continued)

(58) Field of Classification Search
CPC ....... H04L 9/0637; H04L 9/14; H04L 9/3242; H04L 9/3271; H04L 9/50; H04L 9/3239;
(Continued)

(56) References Cited

U.S. PATENT DOCUMENTS

| | | | |
|---|---|---|---|
| 8,528,085 B1 * | 9/2013 | Juels .................... | G06F 21/6218 726/22 |
| 9,992,018 B1 * | 6/2018 | Tjew ..................... | H04L 9/3271 |

(Continued)

FOREIGN PATENT DOCUMENTS

| | | | | | |
|---|---|---|---|---|---|
| AU | 2015240916 B2 | * | 9/2017 | .............. | G06F 11/00 |
| CN | 106845280 A | * | 6/2017 | ........... | G06F 21/645 |

(Continued)

*Primary Examiner* — Eleni A Shiferaw
*Assistant Examiner* — Ali H. Cheema
(74) *Attorney, Agent, or Firm* — Polsinelli PC

(57) ABSTRACT

A system may provide blockchain-based storage node control for unified proof-of-storage interaction for off-chain data chunk storage. The system may include verification circuitry that may provide a challenge to a storage node to audit the storage status of a data chunk. The verification circuitry may obtain identities for the storage node and data chunk based on blockchain records. The verification circuitry may obtain a challenge answer from the storage node in response. The verification circuitry may analyze the challenge answer in view of a challenge key to confirm whether the storage node has possession of the data chunk. When the storage node has possession of the data chunk chain circuitry may add a verification record to the blockchain.

16 Claims, 5 Drawing Sheets

(51) Int. Cl.
*H04L 9/14* (2006.01)
*H04L 9/32* (2006.01)
*G06F 21/64* (2013.01)
*H04L 9/00* (2022.01)

(52) U.S. Cl.
CPC .......... *H04L 9/3242* (2013.01); *H04L 9/3271* (2013.01); *G06F 21/64* (2013.01); *H04L 9/3239* (2013.01); *H04L 9/50* (2022.05)

(58) Field of Classification Search
CPC .... G06F 21/64; G06F 21/602; G06F 21/6218; H04W 12/06
USPC .................................................. 713/193, 185
See application file for complete search history.

(56) References Cited

U.S. PATENT DOCUMENTS

| | | | |
|---|---|---|---|
| 10,621,044 B2* | 4/2020 | Dhuse | G06F 3/064 |
| 10,637,665 B1* | 4/2020 | Sundaresan | H04L 63/083 |
| 10,795,766 B2* | 10/2020 | Dhuse | H04L 63/06 |
| 10,936,412 B1* | 3/2021 | Visvanathan | G06F 12/0866 |
| 11,184,157 B1* | 11/2021 | Gueron | H04L 9/14 |
| 2005/0091491 A1* | 4/2005 | Lee | H04L 9/0825 |
| 2005/0210265 A1* | 9/2005 | Dombkowski | H04L 9/3271 |
| | | | 713/185 |
| 2007/0130213 A1* | 6/2007 | Jean-Denis | G06F 11/2064 |
| 2008/0187003 A1* | 8/2008 | Becker | H04W 72/1273 |
| | | | 370/468 |
| 2010/0008509 A1* | 1/2010 | Matsushita | H04L 9/083 |
| | | | 380/279 |
| 2011/0314346 A1* | 12/2011 | Vas | H04L 9/3242 |
| | | | 714/49 |
| 2014/0237614 A1* | 8/2014 | Irvine | H04L 63/083 |
| | | | 726/26 |
| 2015/0248460 A1* | 9/2015 | Machida | G06F 16/128 |
| | | | 707/639 |
| 2017/0153819 A1* | 6/2017 | Zeng | G06F 11/1458 |
| 2018/0217898 A1* | 8/2018 | Tormasov | G06Q 20/42 |
| 2019/0034454 A1* | 1/2019 | Gangumalla | G06F 16/185 |
| 2019/0036680 A1* | 1/2019 | Sundaresan | H04L 9/0637 |
| 2019/0068382 A1* | 2/2019 | Theodore | H04W 12/06 |
| 2019/0124152 A1* | 4/2019 | Iasi | H04L 67/1097 |
| 2019/0149320 A1* | 5/2019 | Keselman | G06F 16/248 |
| | | | 380/279 |
| 2019/0171847 A1* | 6/2019 | Schneider | G06F 3/0647 |
| 2019/0377899 A1* | 12/2019 | Stecher | G06F 21/6245 |
| 2019/0392170 A1* | 12/2019 | Barday | G06F 16/22 |
| 2020/0042725 A1* | 2/2020 | Bolkhovitin | H04L 67/108 |
| 2020/0050386 A1* | 2/2020 | Natarajan | H04L 63/123 |
| 2020/0076828 A1* | 3/2020 | Nainar | H04L 9/3263 |
| 2020/0089424 A1* | 3/2020 | Klein | G06F 3/0649 |
| 2020/0112445 A1* | 4/2020 | Yoshihama | G06Q 20/401 |
| 2020/0218616 A1* | 7/2020 | Danilov | H04L 67/52 |
| 2021/0174359 A1* | 6/2021 | Lin | H04L 9/3239 |

FOREIGN PATENT DOCUMENTS

| | | | | | |
|---|---|---|---|---|---|
| CN | 107423637 | A | * | 12/2017 | ......... G06F 21/6245 |
| CN | 107918527 | A | * | 4/2018 | .......... G06F 3/0631 |
| CN | 109614037 | A | * | 4/2019 | |
| CN | 109801066 | A | * | 5/2019 | |
| JP | 2000148705 | A | * | 5/2000 | ............ G06F 9/5011 |
| KR | 101586439 | B1 | * | 1/2016 | ............... H04L 9/30 |
| KR | 101593675 | B1 | * | 2/2016 | ........... H04W 12/04 |

* cited by examiner

CRYPTOLOGIC BLOCKCHAIN-BASED OFF-CHAIN STORAGE VERIFICATION

PRIORITY

This application claims priority to U.S. Provisional Application No. 62/826,473, filed Mar. 29, 2019, and entitled Cryptologic Blockchain-Based Off-Chain Storage Verification, which is incorporated by reference in its entirety.

TECHNICAL FIELD

This disclosure relates to blockchain-based verification of storage.

BACKGROUND

Rapid advances in electronics and communication technologies, driven by immense customer demand, have resulted in the widespread adoption of electronic transactions, record keeping, and data sharing. As one example, e-currencies, such as Bitcoin, have displaced paper currencies in millions of transactions per year. Improvements in tracking and/or technological management attached to such electronic transactions will continue to increase the features and options available to operators engaging in electronic tracking.

DETAILED DESCRIPTION

Figure 1:
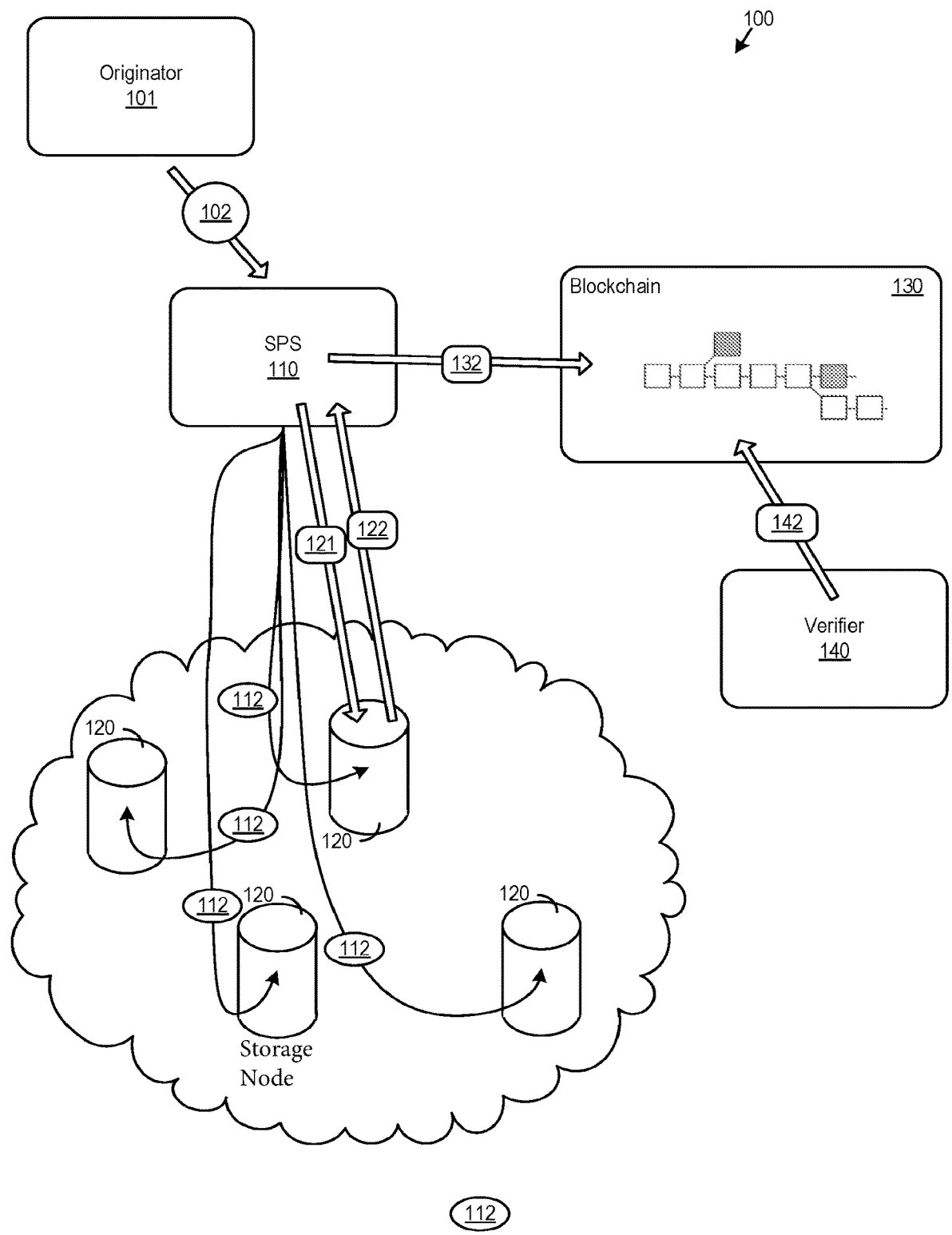
FIG. 1 shows an example storage provability environment.

A blockchain may include a series of data blocks, the blocks including a code, such as a cryptographic hash or checksum, which may be coding-consistent with the content of previous blocks in the series. In some cases, determining multiple different sets of blocks that produce the same integrity code may be insoluble, prohibitively computationally complex, or otherwise effort intensive enough to frustrate attempts to tamper with the contents of the blockchain while maintaining the self-consistence of the integrity codes.

In some cases, network storage solutions, such a cloud-based storage may be tracked and/or verified through direct interactions between the stored file owner and the storage node (e.g., management interface, server, or other interface point from where storage options may be managed). When multiple different storage solutions are used potentially by multiple stored file owners, the number of direct (e.g., point-to-point) file management transactions may grow exponentially. Further, complexities associated with maintaining stored files on multiple different storage solutions may push stored file owners to consolidate storage to fewer nodes when in some cases a heterogeneous storage solution may be advantageous absent such interaction and file tracking complexities.

In some scenarios, an interaction that a file owner may have a storage node may include a proof-of-storage request. The file owner (or a proxy) may provide a challenge to the storage node. The storage node may respond with a challenge answer. Providing a "correct" challenge answer may be of trivial computational complexity to a system in possession of an originally stored file. However, providing a "correct" challenge may be functionally impossible to compute for a system without access to the originally stored file. In some cases, the full originally stored file may be used to compute the challenge answer. In some cases, selected portion of the file may be used to compute the challenge answer. The "correctness" of the challenge answer may be verified through comparison to pre-stored keys held (or otherwise accessible) by the challenger.

In some cases, different storage nodes may support different proofs-of-storage (or none at all) that use different protocols, key formats, proof algorithms, or other parameters. Accordingly, a file owner maintaining files on multiple different storage nodes may be compelled support multiple different proof-of-storage schemes to allow for verification of the multiple files. Accordingly, a standardized platform and/or protocol for proof-of-storage may obviate dedicating resources and time involved in supporting multiple different proof-of-storage schemes. The techniques and architectures may provide a technological simplification to the technological challenge of compulsory support of multiple proof-of-storage schemes.

In some implementations, blockchain based platforms or other distributed ledger technologies (referred to collectively as "blockchain" for clarity and brevity) may support consensus operations, smart contracts, executable code, or other enforcement mechanisms to implement proof-of-storage interaction and/or monitoring across multiple storage nodes. Accordingly, blockchain may provide a unified platform allowing a file-owner to communicate with the peer network hosting the blockchain instead of interacting with storage nodes directly. "Cryptologic" may be used to describe any technology or algorithm (or related part thereof) based on encryption, obfuscation, hashing, or other cipher-based system.

In some implementations, participating storage nodes may adopt the proof-of-storage scheme of the blockchain. For example, in the specific illustrative example implementations included within the drawing sheets, a system using indexed keys and tagged file chunks is discussed. As noted below, these examples included within the drawing sheets are not intended to be limiting, but rather, in some cases, specific examples to aid in the illustration of the described techniques and architectures.

In some implementations, the blockchain may adapt to the proof-of-storage scheme of the storage node. For example, storage node specific smart contacts (or other on-chain executable code) may define operations for compliance with the proof-of-storage scheme of the node (for example a Merkle Tree based scheme or other proof-of-storage schemes). When requesting a verification of current storage, a peer node storage verifier may provide a challenge to the storage node in accord with the defined proof-of-storage scheme.

In the context of storage node interactions, a peer network node participating in a blockchain and using verification circuitry (which may execute verification logic) may determine that storage of the specific data chunk is assigned to the specific storage node. For example, the peer network node may receive a request to store a file (that includes the specific data chunk) at the storage node from a file owner. In some cases, the peer network node may review blockchain records to determine a storage node storage assignment. In some cases, the peer network node may be the file owner.

Based on the identity of the specific data chunk and/or the identity of the storage node, the peer network node may obtain a challenge for provision to the specific storage node. For example, the peer network node may access a challenge record stored in the blockchain. In some cases, peer network node may provide a tuple referencing the challenge record and a selected index (e.g., randomly selected) to derive a challenge and corresponding challenge key from the challenge record.

Additionally or alternatively, the peer network node may obtain a challenge by determining a specific proof-of-storage scheme for the specific storage node and then obtain from the blockchain a challenge in accord with the specific scheme.

For the various schemes, the challenge may be derived using the specific data chunk such that determining the correct challenge answer for the challenge may compel possession of the specific data chunk. Accordingly, providing the correct challenge answer proves local storage of the specific data chunk. The challenges may be pre-generated e.g., by a trusted node at the time of storage assignment to the storage node. The challenges and corresponding keys may be indexed and stored on the blockchain to support later verifications. Local storage of the original file may not necessarily be required once the challenges are generated. Accordingly, the challenges may be used to verify storage of the file by the storage node even after the locally stored copy of the original file is deleted.

In some cases, a specific set of data chunks (which may correspond to some portion of a file or other larger data chunk being tested) may be associated with each challenge. Because the storage node may be ignorant of which chunks may be used for any given challenge, ignorant of which specific challenge may be issued (e.g., the challenge may be to randomly, pseudo-randomly, and/or otherwise non-deterministically selected), or both, the storage node may be compelled to store (and in some case redundantly store) the entire original file to ensure the ability to answer later challenges. Tags may be used to identify which data chunks of a file are involved in solving a particular challenge.

Using network circuitry, the peer node may send the challenge to the storage node. In response to the challenge, peer node may receive a challenge answer from the storage node.

After the challenge answer is received, the peer node may analyze challenge answer to verify a current availability of the content of the specific data chunk at the storage node. For example, the peer node may compare the challenge answer to a challenge key. In some implementations, the challenge key may include a hash or other cryptographic primitive derivable based on the challenge and the content of the specific data chunk (and, in some cases, other data chunks also tagged for the challenge).

In some implementations, the challenge key may be a cryptologic key derived from content of a selected set of one or more data chunks (e.g., including the specific data chunk or a portion thereof), the challenge (e.g., when the challenge includes a salt, state variable input, or other additional parameter to reduce predictability of the challenge key), and index for the key, and/or other inputs. The cryptologic key may be referenced to an index. In some cases, multiple key/challenge/index tuples may be complied into a challenge record. Individual challenges may be referenced by identifying the challenge record (e.g., through identification of the stored file) and providing an index for the individual challenge.

In some implementations, the challenge key may include one or more hashes from a Merkle Tree generated based on content of a file that includes the specific block. The one or more hashes may include a root hash for the Merkle Tree. Particularized challenges (e.g., referencing different hashes within the Merkle Tree and/or generated with different challenge inputs to the Merkle Tree (e.g., the file and a salt, state variable, index, and/or other input)) may be referenced to indices and stored within a challenge record.

In various implementations, other challenge/challenge answer formats for other proof-of-storage schemes. Records of the challenges and challenge keys may be accessible to the peer network nodes to perform verifications. The various individual challenges may be referenced to indices to match challenge/challenge key groupings.

If the storage of the specific data chunk cannot be confirmed (e.g., the incorrect answer is provided or no answer is provided (e.g., within a timeout window)), the peer node performing the verification may, in some cases, using chain circuitry (configured to handle blockchain interactions) create a record of the failed challenge in the blockchain. In some cases, the peer network nodes may alert the file owner and/or storage node after one or more failed attempts. For example, the peer network node may request a retry from the storage node after a failure, and after a determined number of failed retries, the peer network node may inform the file owner.

If storage of the specific data chunk is verified (e.g., after verifying the correctness of a challenge answer), the peer network node may use chain circuitry to record a block indicating the verification on the blockchain. In some cases, a storage assignment to a particular storage node may not be complete (e.g., according to smart contract, consensus operations, or other executable code) until an initial verification of storage is recorded on the blockchain. In some cases, audits at various intervals (periodic, aperiodic, random, pre-defined, or other intervals) may be used to maintain validity of a storage assignment. In some cases, remuneration for storage services may be tied to maintaining a valid storage assignment over one or more intervals.

In some cases, the record on blockchain may include the challenge answer or a verification result based on the challenge answer. Accordingly, other verifiers may recheck the verification performed by the first peer network node. Thus, verification may be performed in a trustless environment. A trustless environment may include an operating environment in which assertions made by any particular node may be checked by other nodes. Accordingly, reliance on the trustworthiness of the particular node may not necessarily be compulsory. The record may further include an identified for the relevant storage node.

Referring now to FIG. 1 an example storage provability environment 100 is shown. An originator 101 may have data 102 (such as, one or more files) for storage. A storage provability system SPS 110 may obtain the data 102 and send the data 102 as one or more data chunks 112 to storage nodes 120 for storage. The storage provability system 110 may generate challenges (e.g., based on keys generated while the storage provability system 110 was in possession of the data chunks) that may be solved by a system in possession of the original data chunk 112. In some cases, the challenges may be impossible or impracticable to solve for systems not in possession of the original data chunk 112 (or chunks) referenced in the challenge 121. In some cases, even good-faith possession of an inadvertently corrupted data chunk may be insufficient to solve the challenge 121. The storage node may provide a challenge answer 122. The storage provability system 110 may then cause the challenge answer 122 (or digest or a verification result derived therefrom) and some indication of the original challenge 121 to be posted to an entry 132 in a block that is appended to a blockchain 130. In some cases, verifiers 140 may review the entry 132 to determine whether the challenge answer (or other derived information in the block) demonstrates that the storage node is in possession of the relevant data chunks. In some cases, verifiers 140 may add a token 142 (e.g., a digital signature or other confirmation data) indicating that the verifier independently confirmed that the challenge answer demonstrated possession.

Figure 2:
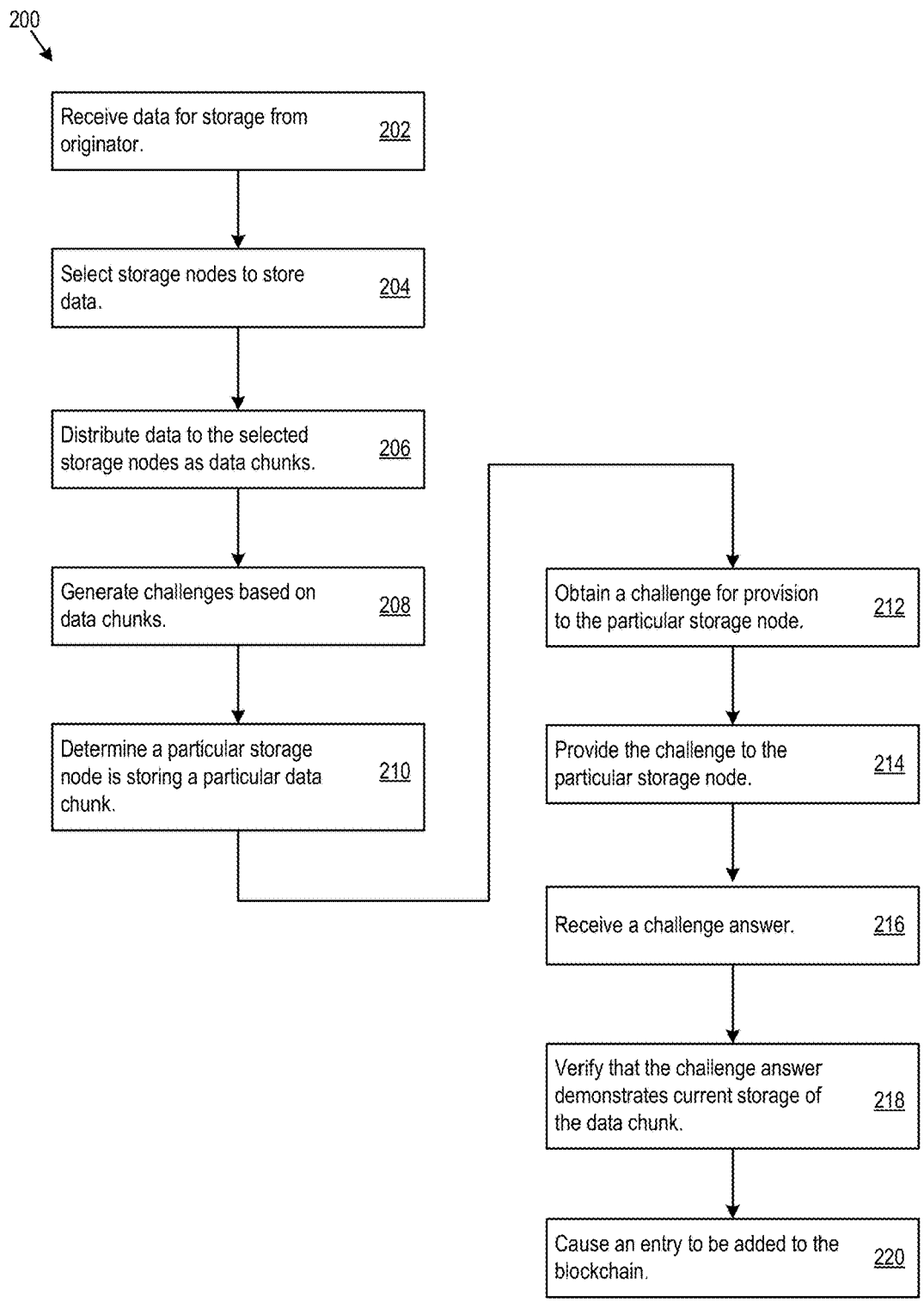
FIG. 2 shows example storage provability logic.

Continuing to refer to FIG. 1 and now also referring to FIG. 2, FIG. 2 shows example storage provability logic (SPL) 200, which may be executed on circuitry. The storage provability logic 200 may receive (e.g., on behalf of the SPS 110 and via network interface circuitry) data 102 for storage from the originator 101 (202). The SPL 200 may select one or more storage nodes to store the data 102 (204). The storage nodes may include various storage systems, which may be independent of one another and/or the SPL 200. Thus, confirmation of storage at one storage node may not necessarily provide confirmation of (or even confidence in) storage at another storage node. The storage nodes may use various storage paradigms, such as, hard drives, solid-state storage, optical storage, network attached storage (NAS), cloud storage, blockchain-based storage, volume storage, object storage, database storage, or other storage.

The SPL 200 may distribute the data to the selected storage nodes in data chunks (206). The data chunks may include portions of the data from the originator. In some cases, the data from the originator may be divided into multiple data chunks which may be sent to multiple different nodes. In some cases, the data may be distributed across the nodes and/or mirrored at multiple nodes for redundancy of storage. In some cases, the data may be aggregated with other data to form a chunk. In various implementations, a chunk may be a smaller quantity of data than that supplied by an originator or a chunk may be a larger quantity of data than that supplied by an originator. In some cases where a data chunk is a smaller quantity, data from an originator (regardless of volume) may be divided into a pre-defined number of data chunks for storage at one or more storage nodes.

After the data chunks are formed, the SPL 200 may generate challenges based on the data chunks (208). The challenges may include cryptographic puzzles that may be solvable with comparative ease when the challenge recipient is in possession of the data chunk that is the subject of the challenge. For example, one challenge may be to provide a hash of the data chunk multiplied by or concatenated with a challenge parameter provided as part of the challenge. Calculation of such a hash is a straightforward calculation when in possession of the data chunk. However, if the data chunk is corrupted or lost to the storage node, the challenge may be impossible or impracticable to solve. In various implementations, multiple data chunks 112 at a storage node 120 may make up data 102 from an originator 101. The multiple data chunks 112 may be randomly or otherwise non-deterministically polled (e.g., with challenges) to confirm storage. Polling the portions of a quantity of data (e.g., such as a file) may help to ensure storage of the entire file without requiring polling of the entire file at each polling interval. In various implementations, the SPL 200 may call challenge generation logic (CGL) 300 to generate challenges based on the data chunks. After the challenges are generated and the data chunks are distributed to the storage nodes, the SPL 200 may delete local copies of the data chunks. In various implementations, the SPL 200 may not necessarily require access to the original data chunk to verify its storage at the storage nodes (e.g., via the use of provable storage techniques).

After the data chunks 112 distributed to the storage nodes 120, the SPL 200 may begin verification of the storage of the data chunks at the storage nodes. The SPL 200, e.g., using verification circuitry, may determine that a particular storage node 120 is storing a particular data chunk 112 (210). Based on the particular data chunk, the SPL 200 may select and/or obtain a challenge for provision to the storage node (212). The SPL 200 may provide the challenge to the storage node (214).

In response to the challenge, the storage node may provide a challenge answer that may be received by the SPL 200 (216). The SPL 200 may analyze the challenge answer to verify that the challenge answer demonstrates current storage of the data chunk (218). For example, the SPL 200 may verify that the challenge answer corresponds to a challenge parameter from the challenge. In some cases, the SPL 200 may verify that the challenge answer corresponds to a challenge key that may be maintained secretly by the SPL 200. For example, a challenge parameter and challenge key may be maintained as an indexed tuple. The SPL 200 may send the challenge parameter as the challenge (or a portion thereof) and hold the challenge key as a secret. The SPL 200 may then compare the received challenge answer to the challenge key.

In some cases where the challenges are indexed, for example as indexed tuples, the challenge may be selected non-deterministically from among the indices. Non-deterministic selection may include random, pseudorandom, stochastic, noise based, or otherwise non-deterministic selection. Non-deterministic selection may ensure that the particular challenge parameters cannot be predicted in advance of provision of the challenge. Preventing prediction of the details of the challenge may ensure that is cannot be solved before provision allowing storage of the challenge answer in lieu of the actual data chunk. In some cases, the order in which indices are provided may be deterministic. However, in some cases including some with deterministic ordering, the challenge parameters themselves may be non-deterministically selected from a space of possible parameters. In some cases, the space of possible parameters may be selected to be large enough that probability of guessing which parameters are selected is similar to the probability of solving the cryptographic challenge through random guessing. However, the space can be made smaller for a trade-off between parameter storage size and system security.

In various implementations, a cryptographic challenge may be derived from a cryptographic structure such as a Merkle Tree. For example, hashes of multiple data chunks along with a challenge parameter may be used as leaves for a Merkle Tree. The hashes may successively hashed together to obtain the multiple layers of the Merkle Tree to obtain the root which is the (single-entry) top layer of the Merkle Tree. The challenge may correspond to providing a challenge parameter, identifying the relevant data chunks and requesting that the storage node provide the proper root.

Once the challenge answer has been verified, the SPL 200 may compile an entry for a block on a blockchain used to track the storage status of the data 102 from the originator 101. The entry may include an identifier for the storage node and the challenge answer (or a result derived from the challenge answer). For example, the entry may include a digest of multiple challenge answers from multiple challenges. For example, headers and or other fields that may be present in the challenge answer may be removed. In some cases, portions of the challenge answer that are not necessarily used in independent demonstration of current availability/storage of the data chunk may be removed from the challenge answer before it is added to the entry.

After compiling the entry, the SPL 200 may cause the entry to be appended to the blockchain on as part of a block (220). In various implementations, the block may be the next block with available space store the entry. In some cases, the SPL 200 may request storage of the entry, but may not necessarily have control of which block is used to store the entry on the blockchain.

Figure 3:
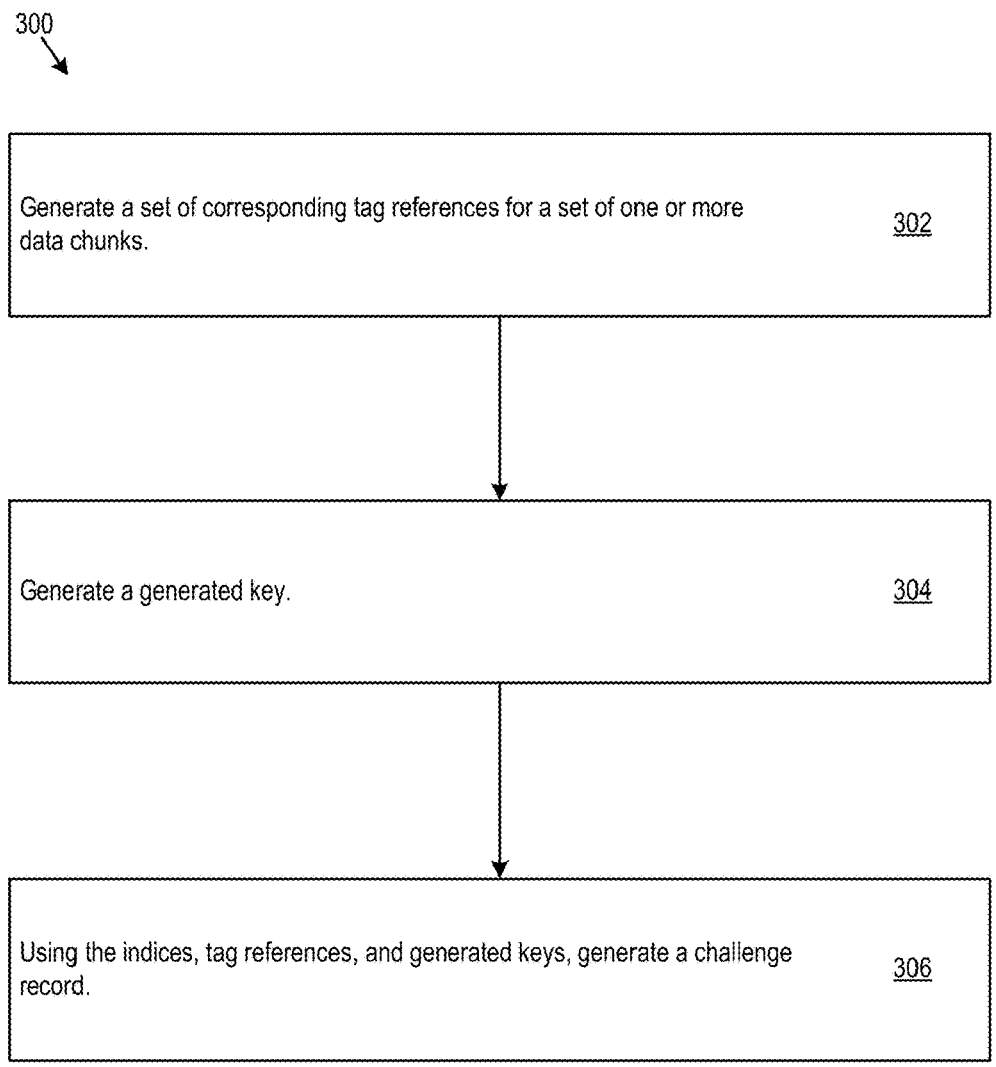
FIG. 3 shows example challenge generation logic.

FIG. 3 shows example CGL 300, which may be implemented on circuitry. The CGL 300 may, for each of multiple indices associated with data 102 (such as a file) from an originator 101, create a set of corresponding tag references a set of one or more data chunks (302). The indices may correspond to challenge parameters. The tag may include a field or other data structure identifying and/or referencing the one or more data chunks and a reference to the corresponding index for the data 102.

The CGL 300 may, for each set of data chunks, generate a generated key (304). A generated key may include a challenge key, or other cryptographic primitive used to establish current storage of the data 102 (or a portion thereof). For example, a generated key may correspond to a hash of a data chunk multiplied, concatenated, or otherwise mixed with a challenge parameter. Here, the challenge may be based on the challenge parameter and the generated key may correspond to the solution. To provide a challenge to a storage node, the SPL 200 may provide the tags to identify the data chunks and the index to provide to challenge parameters.

After generation of generated keys for each of the indices, the CGL 300 may generate a challenge record (306). The challenge record may include a tuple for each of the multiple indices. The tuple may include the generated key and tag referencing the relevant data chunks. A single data chunk may be referenced in multiple different challenge tags in multiple different tuples. Multiple possible challenges for a single data chunk may allow a series of tests to confirm storage of that specific data chunk over time.

The CGL 300 may cause the challenge record to be stored on a blockchain. For example, the CGL 300 may send the challenge record to one or more peer nodes participating in a peer network for a blockchain. In some cases, the generated keys may be encrypted, obfuscated, or withheld to prevent extraction of the solutions to the challenges by the storage nodes. In some cases, the blockchain may include a private blockchain in which the SPL 200 and verifier nodes have access to the blockchain, but storage nodes do not necessarily have access to the blockchain.

Figure 4:
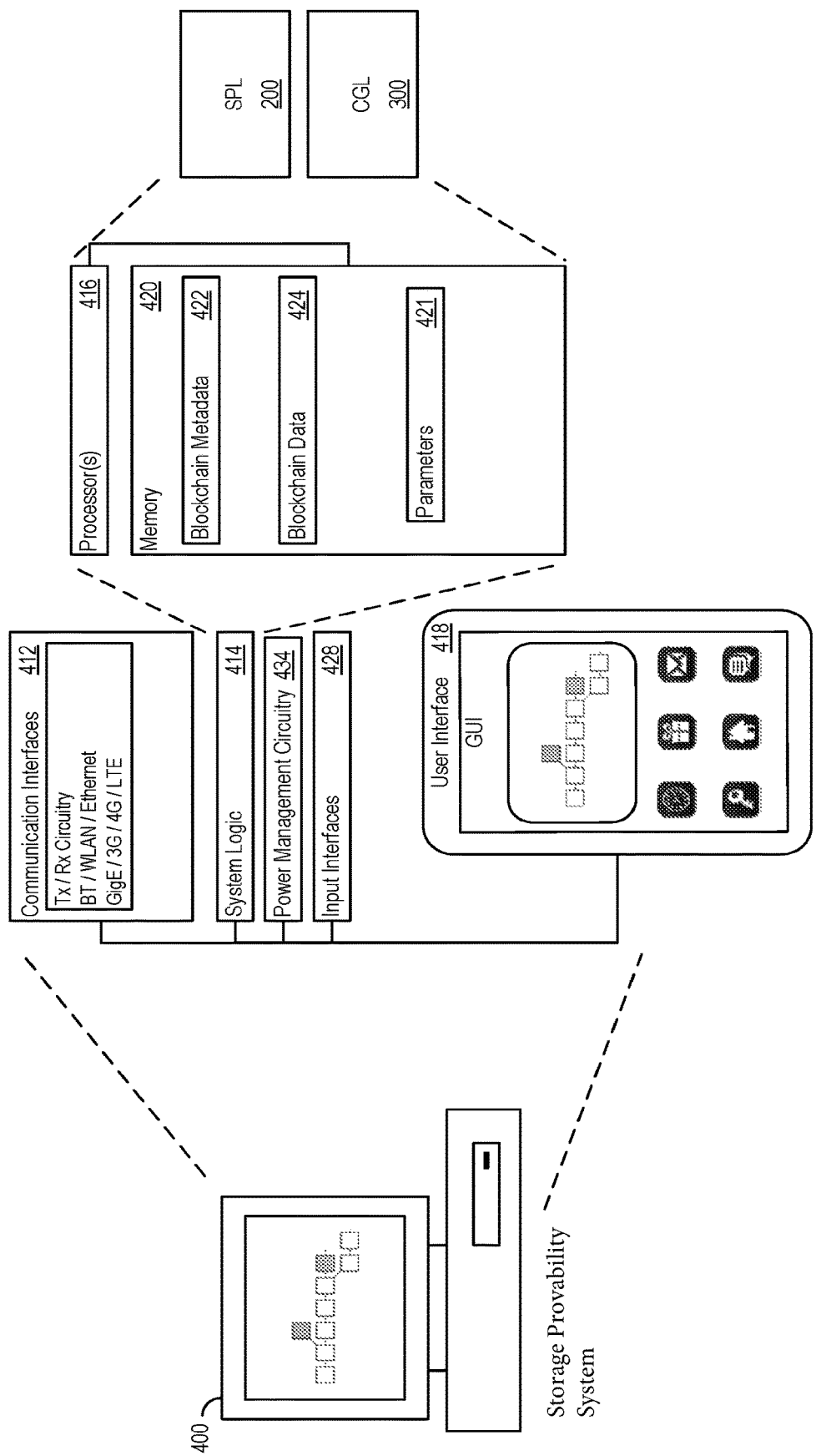
FIG. 4 shows an example shows an example storage provability system.

FIG. 4 shows an example storage provability system (SPS) 400, which may provide an execution environment for implementing storage verification, blockchain interaction, and/or challenge key generation. The SPS 400 may include system logic 414 to support encryption and decryption; generation of cryptologic parameters; generation of challenges; accessing challenge records; blockchain entry generation and/or other actions. The system logic 414 may include processors 416, memory 420, and/or other circuitry, which may be used to implement the SPL 200 and/or the CGL 300. In some implementations, the SPS 400 may act as network interface circuitry, chain circuitry, verification circuitry, and/or generation circuitry. However, various implementations may have logic to support operation as subset of the aforementioned circuities and may not necessarily have logic to support operation as all of the aforementioned circuitries.

The memory 420 may be used to store blockchain metadata 422 and/or blockchain data 424 used in data storage verification. The memory 420 may further store encryption parameters 421, such as an encryption key values, challenge parameters, or other secret values, that may facilitate challenge generation and/or provision.

The memory 420 may further include applications and structures, for example, coded objects, templates, or one or more other data structures to support data storage verification. The SPS 400 may also include one or more communication interfaces 412, which may support wireless, e.g. BLUETOOTH, Wi-Fi, WLAN, cellular (3G, 4G, 5G, LTE/A), and/or wired, ethernet, Gigabit ethernet, optical networking protocols. Additionally or alternatively, the communication interface 412 may support secure information exchanges, such as secure socket layer (SSL) and/or other encryption-based protocols for sending and receiving private data. The SPS 400 may include power management circuitry 434 and one or more input interfaces 428.

The SPS 400 may also include a user interface 418 that may include man-machine interfaces and/or graphical user interfaces (GUI). The GUI may be used to present interfaces and or storage verification options to operators working on behalf of the parties.

Figure 5:
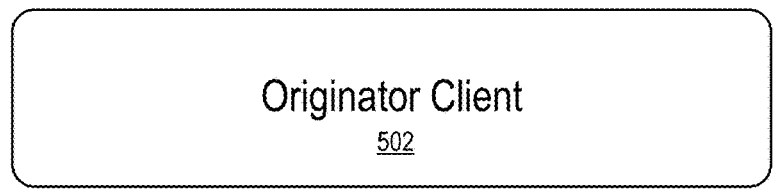
FIG. 5 shows an example storage provability system implementation.
Figure 5:
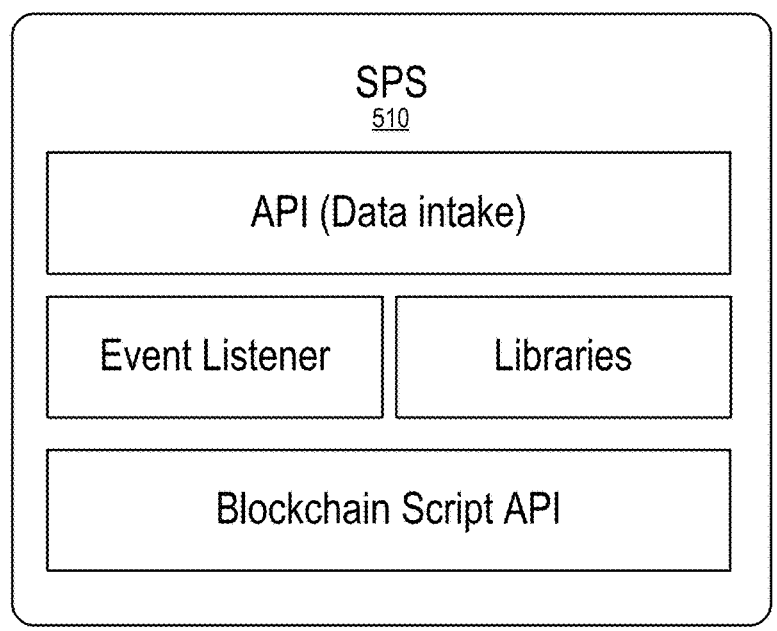
Figure 5:
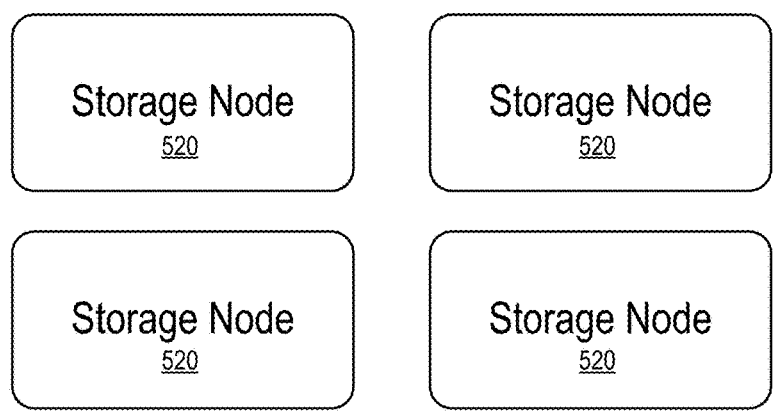

FIG. 5 shows an example SPS implementation 500. In the example implementation 500, a data originator client 502 may submit data to an example SPS 510, the example SPS 510 may include. An application programming interface (API) may manage data intake and client interfacing. The SPS may include event listeners for scheduling and libraries to support the APIs. A blockchain script API may invoke smart contracts on the blockchain to enforce storage parameters and validation at the storage nodes 520. Invocation of the smart contracts may implement verification and challenge provision by (and/or on behalf of) the SPS 510.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system including:
network interface and verification circuitry configured to:
divide a file into a plurality of data chunks;
distribute a specific data chunk of the plurality of data chunks to a specific storage node of multiple selectable storage nodes;
distribute a remaining plurality of data chunks of the plurality of data chunks to the multiple selectable storage nodes;
generate, after the specific data chunk is distributed to the specific storage node, a challenge for provision to the specific storage node, wherein
the challenge is derived based on content of the specific data chunk; send the challenge to the specific storage node, wherein
the challenge is a proof of storage challenge for verification that the specific data chunk is currently stored at the specific storage node; and
in response to the challenge, receive a challenge answer from the specific storage node, wherein
the challenge answer is based on the challenge including the verification of the proof of storage challenge of the specific data chunk stored at the specific storage node and further based on the content of the specific data chunk;
after the challenge answer is received, analyze the challenge answer to verify a current availability of the content and assignment of the specific data chunk at the specific storage node, where analyzing the challenge answer includes comparing the challenge answer to a challenge key that corresponds to a root of a Merkle Tree; and
chain circuitry configured to:
compile a specific block, the specific block including:
an identifier for the specific storage node; and
the challenge answer;
provide the specific block to be appended to a blockchain for verification of storage of the specific data chunk; and
poll each of the multiple selectable storage nodes at intervals with a plurality of respective challenges to confirm storage of the remaining plurality of data chunks.

2. The system of claim 1, where the challenge answer, the challenge key, or both are obtained from the Merkle Tree, which is based on the specific data chunk.

3. The system of claim 1, where the challenge is associated with a specific index.

4. The system of claim 3, where the verification circuitry is further configured to non-deterministically select the specific index from among multiple indices to obtain the challenge.

5. The system of claim 3, where the specific index is used to identify the specific data chunk.

6. The system of claim 5, where the specific data chunk includes one data chunk from among multiple data chunks making up a file.

7. The system of claim 6, where the specific data chunk includes one data chunk from a non-deterministically selected subset of the multiple data chunks making up the file.

8. The system of claim 7, where the non-deterministically selected subset of the multiple data chunks is defined for the specific index tag.

9. The system of claim 6, wherein the specific data chunk includes one data chunk from a deterministically selected subset of the multiple data chunks making up the file.

10. The system of claim 9, where the deterministically selected subset of the multiple data chunks is defined for the specific index.

11. The system of claim 1, where the challenge is obtained in accordance with the proof of storage challenge from the blockchain.

12. A method comprising:
dividing, by a network interface and verification circuitry, a file into a plurality of data chunks;
distributing, by the network interface and verification circuitry, a specific data chunk of the plurality of data chunks to a specific storage node of multiple selectable storage nodes;
distributing, by the network interface and verification circuitry, a remaining plurality of data chunks of the plurality of data chunks into the multiple selectable storage nodes;
generating after the specific data chunk is distributed to the specific storage node, by the verification circuitry, a challenge for provision to the specific storage node, wherein the challenge is derived based on content of the specific data chunk;
sending, by a network interface circuitry, the challenge to the specific storage node; and
in response to the challenge, receiving a challenge answer by the network interface circuitry from the specific storage node, wherein
the challenge answer is based on verification of the challenge including proof of storage of the specific data chunk stored at the specific storage node and the content of the specific data chunk;
after the challenge answer is received, analyzing, by the verification circuitry, wherein
the challenge answer verifies a current availability of the content of the specific data chunk at the specific storage node, and
the analyzing of the challenge answer includes comparing the challenge answer to a challenge key that corresponds to a root of a Merkle Tree;

compiling, by a chain circuitry, a specific block, the specific block including:
an identifier for the specific storage node; and
a verification result based on the challenge answer; and
providing, by the chain circuitry, the specific block for appending to a blockchain for verification of storage of the specific data chunk; and
polling, by the chain circuitry, each of the multiple selectable storage nodes at intervals with a plurality of respective challenges to confirm storage of the remaining plurality of data chunks.

13. A system including:
verification circuitry configured to:
select a specific storage node of multiple selectable storage nodes;
select a challenge for provision to the specific storage node, wherein
the challenge is cryptographically derived based on content of a specific data chunk, and
the challenge is associated with a specific index that is used to identify the specific data chunk;
network interface circuitry configured to:
divide a file into a plurality of data chunks;
distribute the specific data chunk of the plurality of data chunks to the specific storage node;
distribute a remaining plurality of data chunks of the plurality of data chunks to the multiple selectable storage nodes;
send the challenge to the specific storage node after the specific data chunk is distributed to the specific storage node; and
in response to the challenge, receive a challenge answer from the specific storage node, wherein
the challenge answer is based on the challenge and the content of the specific data chunk, and
the challenge comprises a proof of storage verification of current storage of the specific data chunk assigned to the specific storage node;
the verification circuitry further configured to:
after the challenge answer is received, analyze the challenge answer to:
verify a current availability of the content of the specific data chunk at the specific storage node, and
determine that storage of the specific data chunk is assigned to the specific storage node; and
chain circuitry configured to:
compile a specific block, the specific block including:
an identifier for the specific storage node; and
the challenge answer;
provide the specific block for appending to a blockchain for verification of storage of the specific data chunk; and
poll each of the multiple selectable storage nodes at intervals with a plurality of respective challenges to confirm storage of the remaining plurality of data chunks.

14. The system of claim 13, where the verification circuitry is further configured to analyze the challenge answer by comparison of the challenge answer to a challenge key.

15. The system of claim 14, where the challenge answer, the challenge key, or both are obtained from a Merkle Tree, which is based on the specific data chunk.

16. The system of claim 13, wherein the verification circuitry is further configured to non-deterministically select the specific index from among multiple indices to obtain the challenge.

* * * * *